May 14, 1940.  R. C. PIERCE  2,200,605
MANUFACTURE OF VENETIAN BLINDS
Filed Sept. 19, 1935  6 Sheets-Sheet 1
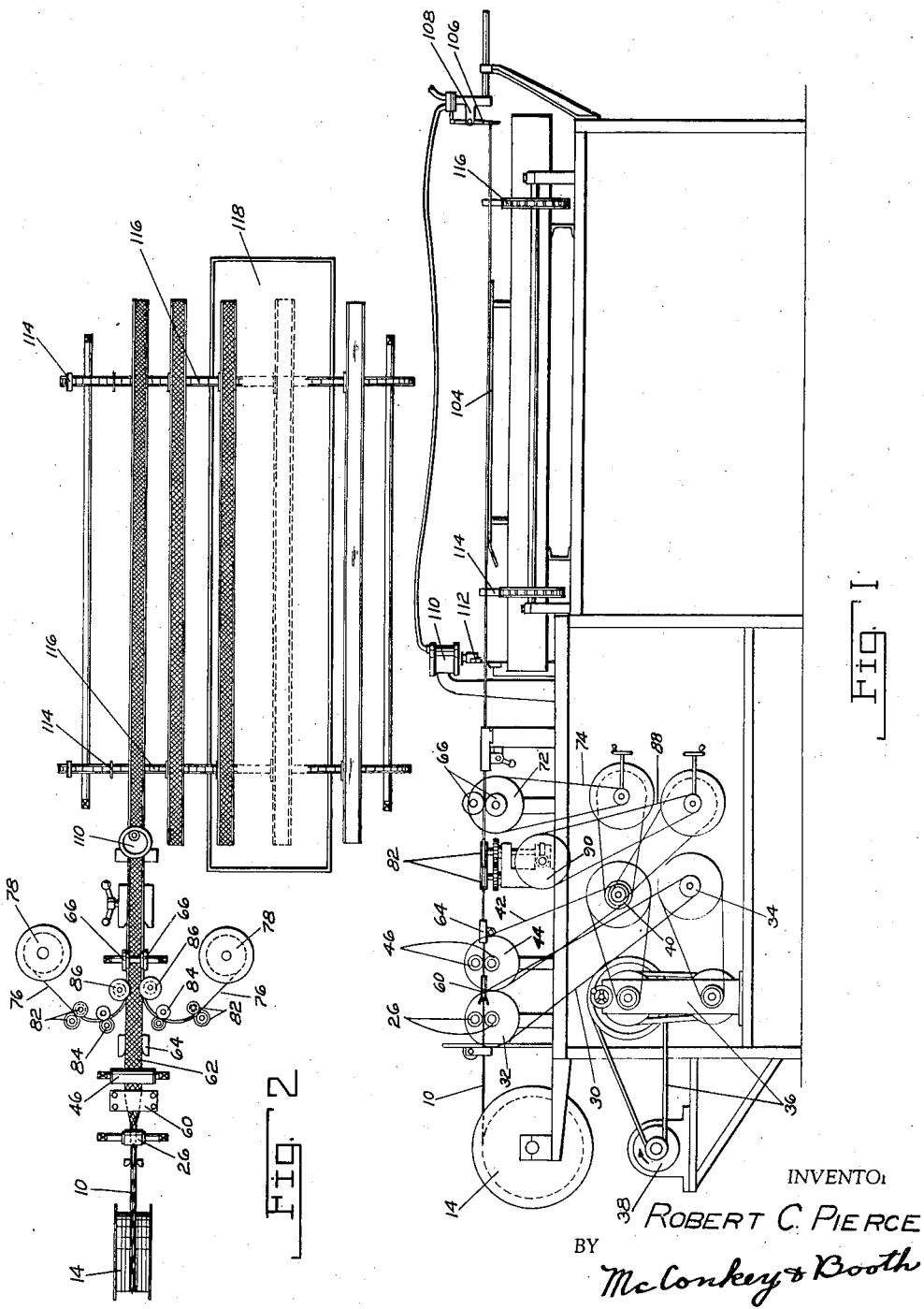

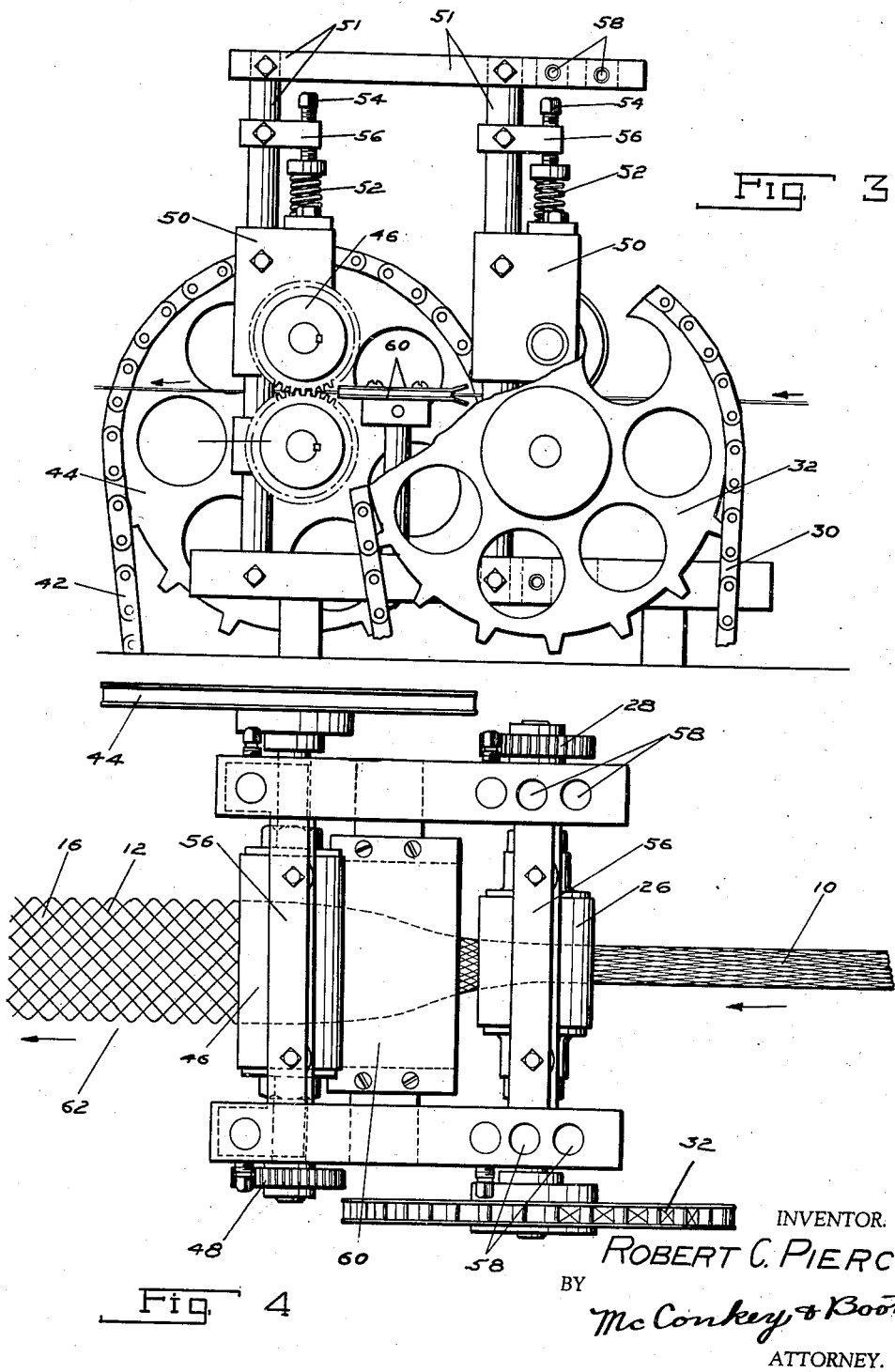

May 14, 1940.  R. C. PIERCE  2,200,605
MANUFACTURE OF VENETIAN BLINDS
Filed Sept. 19, 1935  6 Sheets-Sheet 3
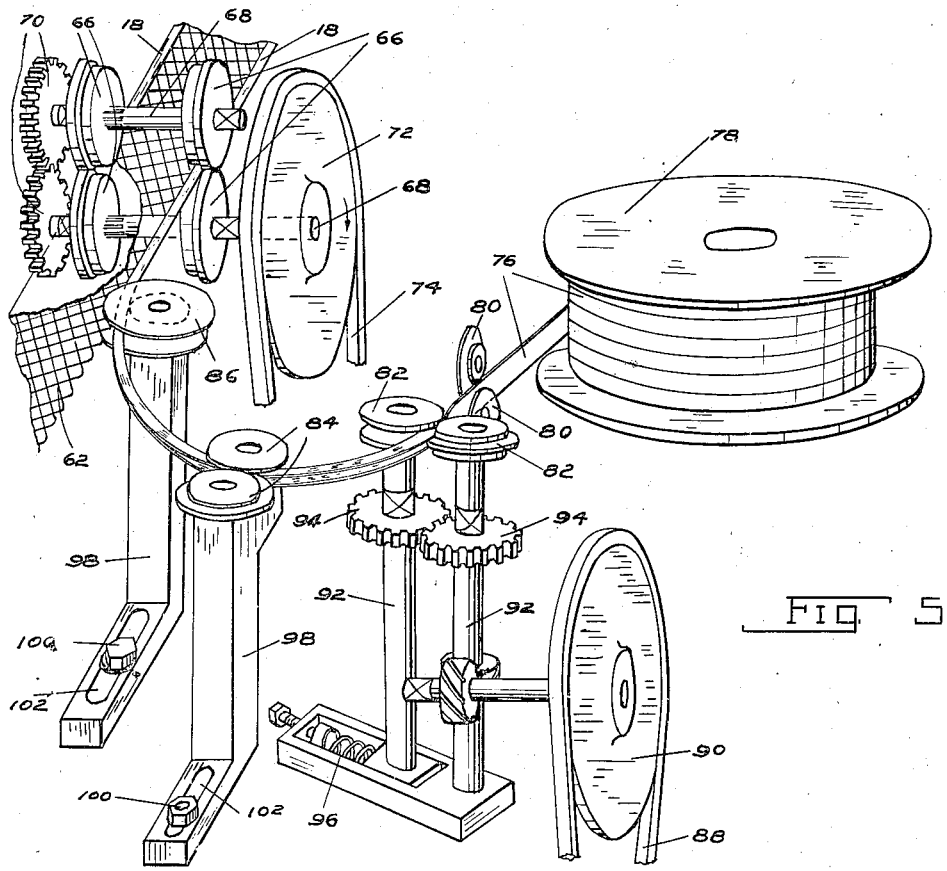
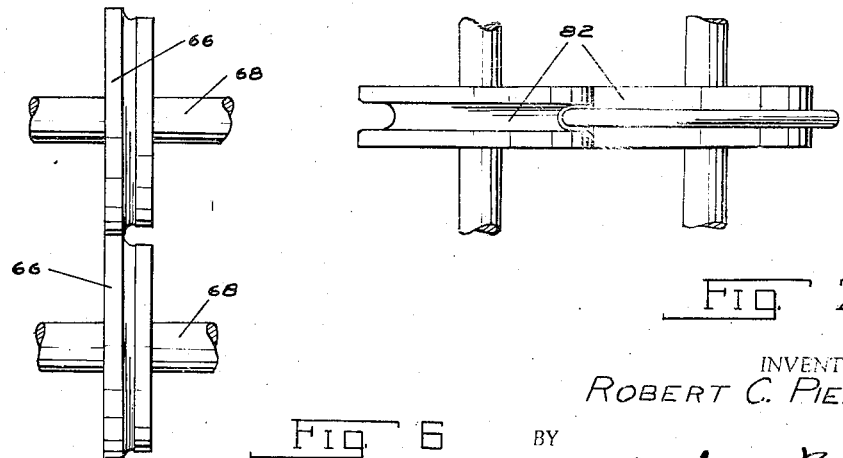
INVENTOR.
ROBERT C. PIERCE
BY
McConkey & Booth
ATTORNEY.

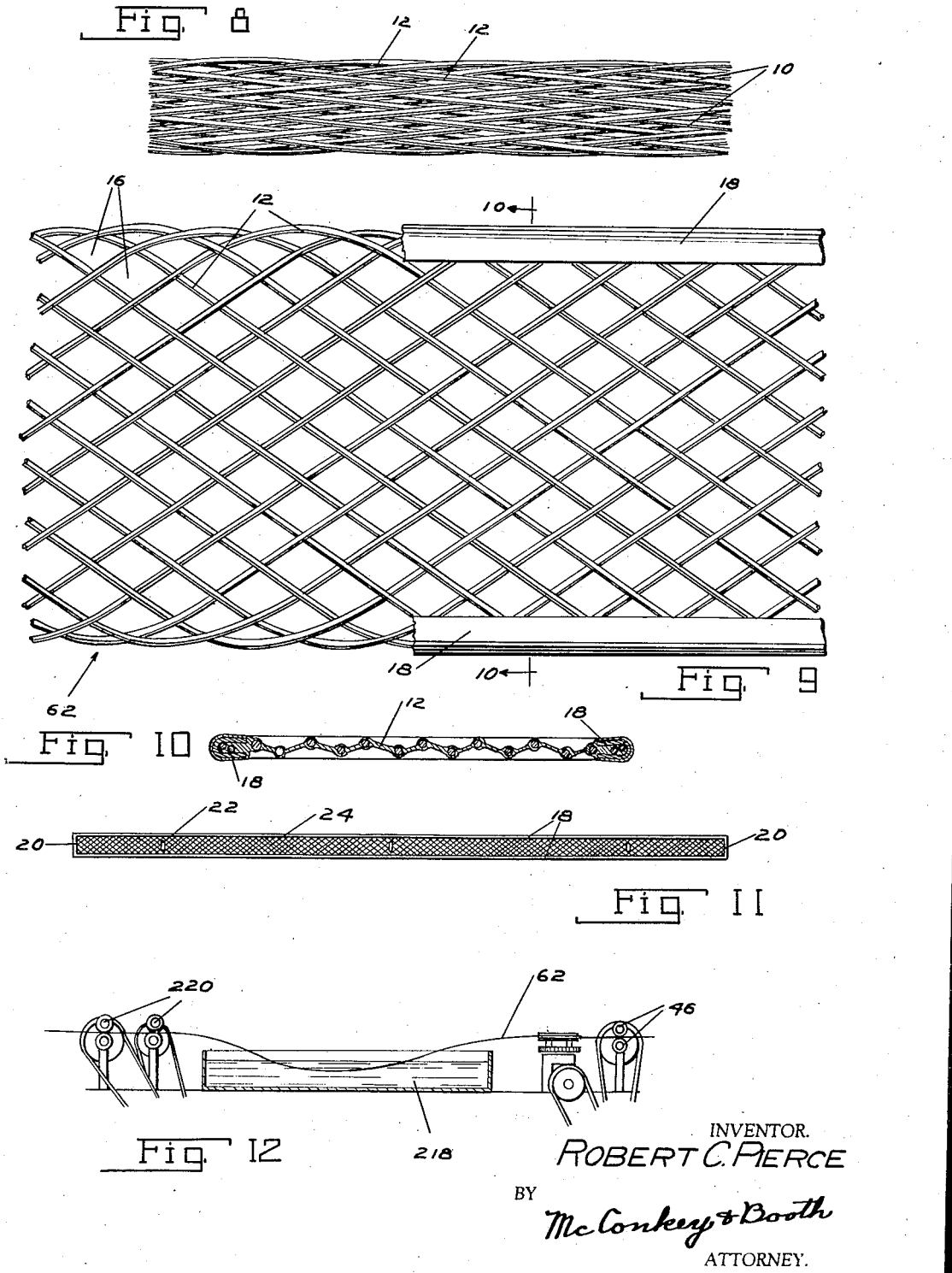

May 14, 1940. R. C. PIERCE 2,200,605
MANUFACTURE OF VENETIAN BLINDS
Filed Sept. 19, 1935 6 Sheets-Sheet 5

INVENTOR.
ROBERT C. PIERCE
BY McConkey & Booth
ATTORNEY.

May 14, 1940.  R. C. PIERCE  2,200,605
MANUFACTURE OF VENETIAN BLINDS
Filed Sept. 19, 1935  6 Sheets-Sheet 6
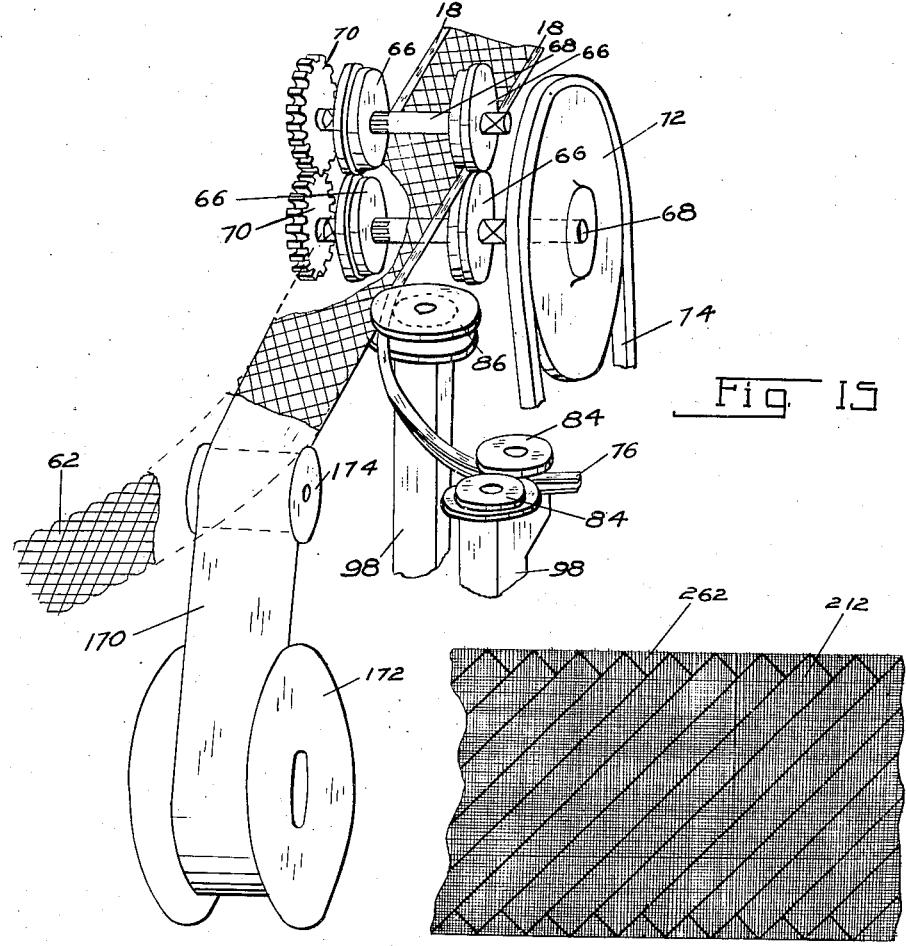
Fig. 15
Fig. 16
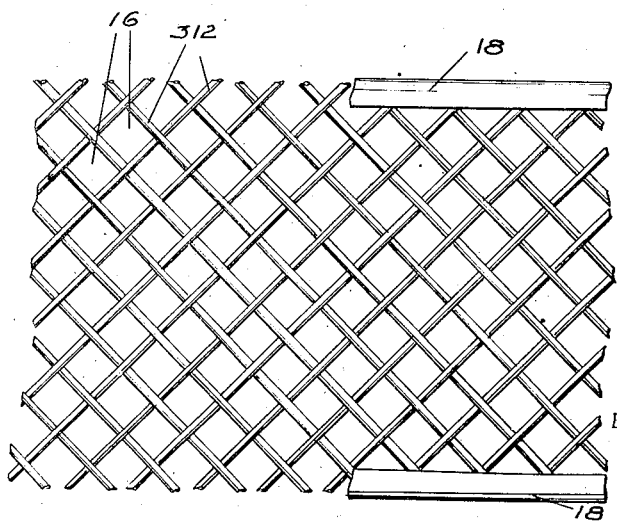
Fig. 17
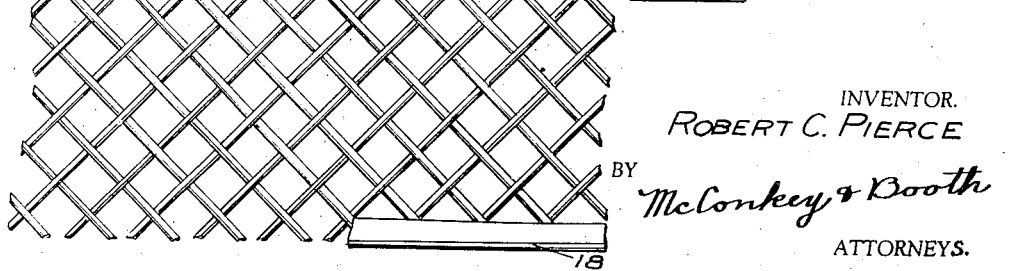
INVENTOR.
ROBERT C. PIERCE
BY
McConkey & Booth
ATTORNEYS.

Patented May 14, 1940

2,200,605

UNITED STATES PATENT OFFICE 2,200,605

MANUFACTURE OF VENETIAN BLINDS

Robert C. Pierce, Niles, Mich., assignor to National Standard Company, Niles, Mich., a corporation of Michigan Application September 19, 1935, Serial No. 41,199

4 Claims. (Cl. 153—2)

This invention relates to the manufacture of Venetian blinds or the like, and more especially to the manufacture of the slats forming the transverse elements or shutters of the blinds.

An object of the invention is to provide a durable lightweight and inexpensive slat or the like having a very attractive appearance, and which is preferably translucent. Having these requirements in mind, instead of using wood or wood-like materials, I construct the slats of wire tapes, preferably braids in which the full strength of all of the wires is utilized by continuing them throughout the length of the slats. These tapes are formed with relatively large spaces between the wires, for example by expanding a wire braid widthwise, and these spaces may be bridged by a film of coating material (preferably applied by dipping) which also serves to cover and protect the wires. Some of the advantages of the invention, however, are obtainable with a preformed film which is bound or otherwise secured over one face of the slat.

This material, when applied as a coating which is formed in place, may be applied in several coats, of different colors if desired, so that (for example) it may appear as three different colors when viewed from one side or the other by reflected light and when viewed by transmitted light.

I prefer to bind the edges of the expanded braid, for example by crimping strips of sheet metal thereon as it leaves the expanding rolls. As the coating step comes at a later stage, the binding so formed on the edges is covered and protected by the coating material. However, if a preformed film is used, the binding may advantageously be utilized to secure it to the braid.

While the full advantages of the invention are best obtained by utilizing an expanded braid, a somewhat cheaper article suitable for many purposes can sometimes be made by cutting blanks from woven wire cloth, preferably diagonally thereof so that the meshes give a diamond appearance, and binding the ragged edges as described above. In this case the dipped coating is of special advantage in giving a continuous impervious coating protecting the wire mesh and the bindings on its ragged edges.

The various mechanisms utilized in making the novel translucent shutters or slats may, if desired, advantageously be embodied in a unitary apparatus which first expands the braid, then binds the edges, then cuts in sections of the required length, and also supplies the coating material. However, it is sometimes better to omit the cutting step in this sequence, making the material up in long lengths which can be stored on reels or the like and cut into sections or slats of the required length when wanted. Various important subcombinations embodied in this apparatus are hereinafter described in detail.

The above and other objects and features of my invention, including various novel combinations and arrangements in the parts of the apparatus, and sequences of steps in the method of manufacture, as well as advantageous features of the finished product, will be apparent from the following description of the manner of manufacture carried out on the apparatus shown in the accompanying drawings, in which:

Figure 1 is a side elevation of one form of apparatus, with the coating tank omitted;

Figure 2 is a top plan view of the working parts of the apparatus of Figure 1, with the coating tank in place;

Figure 3 is a side elevation of the means for expanding the braid widthwise;

Figure 4 is a top plan view of the spreading means shown in Figure 3;

Figure 5 is a perspective view of the means for binding the edges of the expanded braid;

Figure 6 is an elevation of the rolls which crimp the sheet metal strip on the edge of the expanded braid;

Figure 7 is a plan view of the rolls which fold the strip ready to bind the edge of the expanded braid;

Figure 8 is a plan view of a piece of braid before it is expanded;

Figure 9 is a plan view of the braid after it has been expanded, one end of it being shown bound;

Figure 10 is a section on the line 10—10 of Figure 9;

Figure 11 is a plan view of a finished slat or shutter;

Figure 12 is a diagram showing another way of applying the coating material;

Figure 15 is a perspective view corresponding to Figure 5, but showing a preformed film being associated with the braid;

Figure 16 is a diagrammatic plan view showing the cutting of blanks from woven wire cloth; and Figure 17 is a plan view corresponding to Figure 9 but showing the article made from wire cloth.

Figure 13:
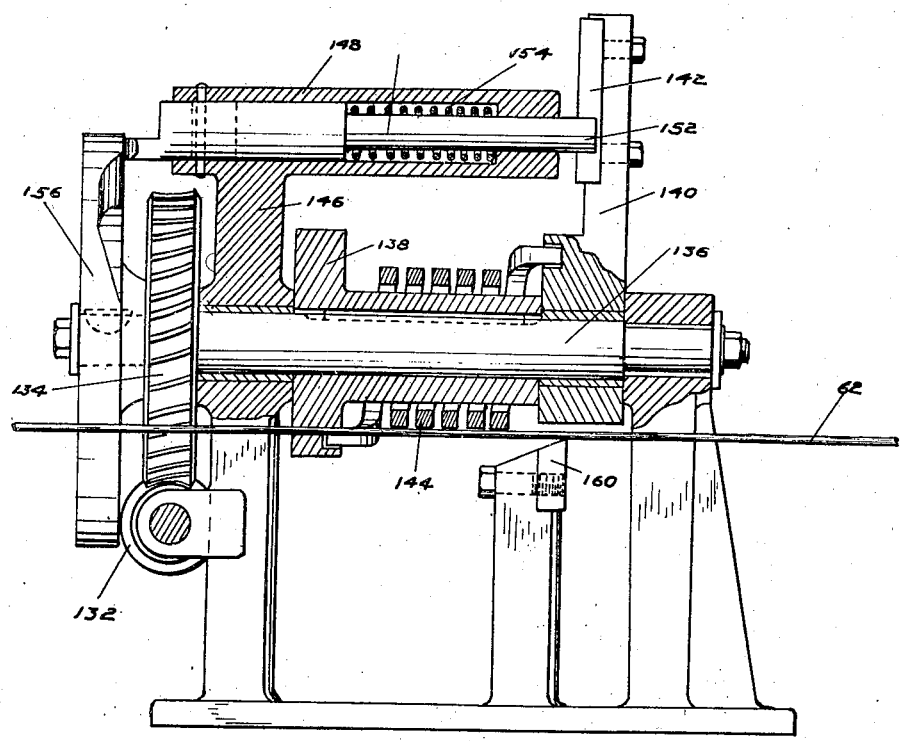
Figure 13 is a section on the line 13—13 of Figure 14 of an alternatively-usable mechanism for cutting the braid into sections.

The apparatus shown in Figure 1 is intended to receive and operate on a wire tape 10, preferably of the structure shown in Figure 8 with interbraided wires 12 running the full length thereof, and which may be carried by means such as a reel 14. The first step in the manufacture of the shutters is the spreading of the wires 12 to provide relatively large spaces 16 (Figure 9) therebetween, the next step is ordinarily to crimp sheet metal binders 18 along the edges, if desired the ends may also be bound with similar sheet metal parts 20 (Figure 11), the coating material is applied, and suitable openings 22 are cut therein to form a finished shutter part or slat 24 shown in Figure 11.

When the apparatus shown in Figure 1 is used, the braid 10 is fed from the reel 14 by rolls 26, (see also Figures 3 and 4), which may be connected by pinions 28 if desired, and which are driven by a sprocket chain or the like 30 passing over a sprocket 32. The chain 30 is shown as driven by a pinion 34 connected through suitable speed reducing gearing 36 to an electric motor or other source of power 38.

The speed reducing gearing 36 also drives a pinion 40 which operates a sprocket chain 42 driving a sprocket 44 positively rotating two rolls 46 which are driven more slowly than the rolls 26, and which are shown as drivably interconnected by means such as pinions 48.

The upper rolls 26 and 46 are shown in Figure 3 as mounted in vertically-slidable blocks 50 guided by supports 51 carried by the frame and adjustably urged downwardly by springs 52 backed up by setscrews 54 carried by rigid arms 56 mounted on the machine frame. The supports 51 for rolls 26 may be adjusted toward and from the rolls 46 by utilizing suitable series of openings 58 formed for that purpose.

Since rolls 46 are driven more slowly than rolls 26, the tape 10 is forced to shorten between the rolls. In order to insure that this shortening will take place by spreading the wires widthwise, and to obviate possible buckling, the braid or other wire tape 10 is fed from the rolls 26 between parallel fixed guide plates 60. Figure 4 shows how the braid is thus spread widthwise into an open fabric 62.

The expanding mechanism described above is claimed in my application No. 74,844, filed April 17, 1936, which is a partial continuation of the present application.

The fabric 62 so produced may, if the edges are to be bound as is usually the case, next be led between guides 64 to two pairs of crimping rolls 66 (see Figures 5 to 7) on parallel shafts 68 interconnected by means such as pinions 70 and driven by a sprocket or the like 72 operated by a chain 74 driven through the speed reducing gearing 36 by the motor 38.

A strip of sheet metal 76 may be led from a spool 78, one on each side of the fabric strip 62, through guide rollers 80 and between forming rollers 82 which fold it to a U-section, thence between a second pair of guide rollers 84 and over a roll 86 to the crimping rolls 66, which compress it to bind the edge of the strip 62 and form the binding 18.

The forming rolls 82 are of the shape shown in Figure 7, and are driven from motor 38 through the speed reducing gearing 36 and a chain 88 passing over a sprocket 90 on a shaft geared to one of two vertical shafts 92 carrying the rolls 82. The shafts 92 are shown interconnected by pinions 94. The shafts 92 may be urged yieldingly together by a spring or the like 96. The various parts may be made adjustable for strips of different widths, by being mounted on supports 98 secured by bolts 100 in slots 102.

The bound strip is then shown as passing over a support or table 104 until the end engages a trip 106 of an air valve 108, admitting compressed air to a cylinder 110 and forcing downwardly a knife 112 which cuts off a section of the length desired for one shutter or slat.

These sections are picked up by fingers 114 on conveyor chains 116, and carried crosswise of their length through a bath 118 of coating material described below, and to or through a suitable drier (not shown).

As shown in Figure 12, if the strip is to be stored on a reel until wanted, and then cut to length on order, it may be led lengthwise through a coating bath 218. Suitable feed rolls 220 may be provided for feeding the coated strip to a drier, or directly to a reel if it is to be dried thereon.

Figure 14:
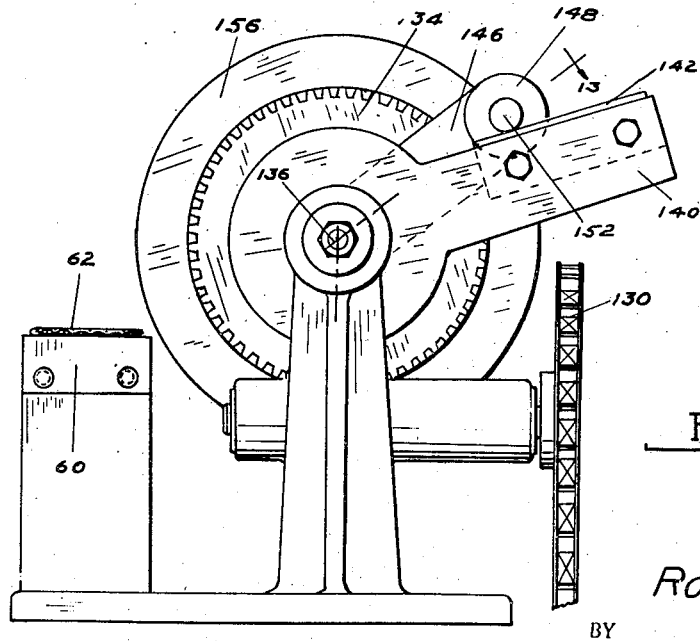
Figure 14 is a side elevation of the cutting mechanism of Figure 13.

Figures 13 and 14 show an alternative cutting mechanism which may be used if the sections are to fall into a suitable container instead of being carried away by a conveyor. In this arrangement the motor 38 and gearing 36 drive, through a suitable chain, a sprocket or the like 130 which rotates a worm 132 driving a worm wheel 134 keyed on a shaft 136. The shaft 136 has keyed thereto a flanged sleeve 138, and has loosely sleeved thereon an arm 140 carrying a knife 142. A stiff torsion spring 144 sleeved about the axis of shaft 136 is connected at one end to the flange of sleeve 138 and at its other end to arm 140.

Arms 146, forming part of the machine frame, carry a guide 148 for a plunger 150 having at one end a stop 152 which is normally in the path of arm 140. This plunger is periodically retracted by a spring 154 when permitted by a cam 156 keyed on the end of shaft 136.

In operation, during most of one revolution of shaft 136 the arm 140 is held by stop 152, and spring 144 is tensioned by the turning of sleeve 138. When the low point of cam 156 is reached, the stop 152 is withdrawn by the spring 154, and the spring 144 suddenly swings the arm 140 to carry the knife 142 around to cooperate with a stationary cutter 160 to cut a section from the strip 62.

The coating material may be any suitable material which can be mixed up with a solvent to such a consistency that it will form a film covering the wires and the edge binding and bridging across the spaces between the wires, and which will dry to form a tough, thin, translucent, durable film. One example might be: 106 lbs. cellulose acetate or nitrate, 27 gallons toluol, 13½ gallons butyl acetate, 4½ gallons butyl alcohol, and 2 gallons dibutyl phthalate. Or a simple solution of nitrocellulose in butyl lactate may be used, sufficient of the solvent being used to make a solution as thin as will bridge across the spaces between the wires. Various other commercial lacquers may be used, consisting of various mixtures of cellulose nitrate or acetate with a plasticizer or a resin or both, and a solvent such as butyl lactate, butyl alcohol, ether, acetone, and the like.

The shutter or slat so made, after the drying of the translucent film, may if desired be additionally treated by brushing or spraying or otherwise applying on one or both of its sides a further coat containing, for example, cellulose acetate and a pigment or dye or other coloring material, with a relatively small amount of solvent which is driven off in drying.

By selecting these outer coatings of suitable different colors, the shutter will appear one color on one side (viewed by reflected light) and a different (reflected) color on the other side, and will be of still a different (combination) color when viewed by transmitted light. This makes possible many and various pleasing effects.

If desired, the shutter may be provided with differently colored intermediate films of the same type of materials. These are not visible from either side by reflected light, but modify the color of the transmitted light. Such intermediate coatings may be of one solid color, or may be applied in various patterns or figures. In some cases these intermediate coatings may be merely a solution of coloring material in a solvent such as butyl lactate. The above described slat and method of making the same are claimed in my co-pending application Serial No. 129,296, filed March 6, 1937 which is a division of this application.

Figure 15 shows how a separate preformed film 170 of cellulose acetate or similar material, may be fed from a reel 172, and associated with one face of the expanded braid 62 by passing both over a guide roller 174 or the like. The edge bindings 18 in this case serve the additional function of securing the film and the braid together.

The slat so formed is claimed as an article of manufacture in my application No. 62,405, filed February 5, 1936, Patent No. 2,156,163, granted April 25, 1939, which is a partial continuation of the present application.

For some purposes, satisfactory shutters may be made by cutting blanks 212 (Figure 16) from a web 262 of woven wire cloth the wires 312 of which are associated by weaving instead of braiding, as appears in Figure 17. I prefer to cut the blanks diagonally, so that the spaces 16 have a diamond appearance. In this case the edge bindings 18 have an additional function (see Figure 17) in covering and protecting the ragged edge formed by cutting the wires 312. It is best to use the dipped coating for this form of shutter, as it forms a continuous impervious protection for the binding 18 for the ragged edges of the wire tape or blank, which extends integrally over the wires 312 and bridges the spaces 16.

While a particular method and preferred apparatus have been described in detail, it is not my intention to limit the scope of my invention by that description, or otherwise than by the terms of the appended claims.

I claim:

1. Apparatus for making shutters or the like comprising means for feeding a tape of braided wire made up of metal wires each extending the full length of the tape and which are carried alternately over and under each other diagonally of the tape and which bend back across the tape at the edges thereof, means for spreading the wires of the braid to form relatively large spaces between them, means for feeding a pre-formed film against one face of said tape, and means for applying bindings to the edges of the associated tape and film to secure them together and to hold the wires in place.

2. Apparatus for making Venetian blinds or the like comprising a pair of driven rollers for feeding a flat braided wire tape, a second pair of rollers spaced from the first pair and driven at a lower speed to expand the tape, means for feeding a preformed film against one face of the expanded tape, means for feeding a strip of sheet metal alongside the expanded tape and film and means for crimping the strip over the edges of the tape and film to bind them together.

3. The method of making shutters for blinds or the like which comprises forming a flat tape of braided wires made up of metal wires each extending the full length of the tape and which are carried alternately over and under each other diagonally of the tape and which bend back across the tape at the edges thereof, expanding the tape to form relatively large spaces between the wires, feeding a preformed film against one face of the expanded tape, and binding the edges of the tape and film together to hold the wires in place and to secure the film to the tape.

4. The method of making shutters for blinds or the like which comprises forming a flat tape of braided wires made up of metal wires each extending the full length of the tape and which are carried alternately over and under each other diagonally of the tape and which bend back across the tape at the edges thereof, expanding the tape to form relatively large spaces between the wires binding the edges of the tape by pressing strips around the tape edges to engage each of the wires on opposite sides of the tape to hold the wires in place and associating a film of material with said tape in intimate contact with the wires of the tape and with the binding to bridge across said spaces.

ROBERT C. PIERCE.